(12) United States Patent
Ishii et al.

(10) Patent No.: US 9,997,187 B2
(45) Date of Patent: Jun. 12, 2018

(54) OPTICAL INFORMATION RECORDING APPARATUS AND METHOD

(71) Applicants: THE ARIZONA BOARD OF REGENTS ON BEHALF OF THE UNIVERSITY OF ARIZONA, Tucson, AZ (US); HITACHI, LTD., Kanagawa (JP)

(72) Inventors: Toshiki Ishii, Tucson, AZ (US); Yuzuru Takashima, Tucson, AZ (US)

(73) Assignees: THE ARIZONA BOARD OF REGENTS ON BEHALF OF THE UNIVERSITY OF ARIZONA, Tucson, AZ (US); HITACHI, LTD. (JP)

(*) Notice: Subject to any disclaimer, the term of this patent is extended or adjusted under 35 U.S.C. 154(b) by 0 days. days.

(21) Appl. No.: 15/504,051

(22) PCT Filed: Aug. 15, 2014

(86) PCT No.: PCT/US2014/051233
§ 371 (c)(1),
(2) Date: Feb. 15, 2017

(87) PCT Pub. No.: WO2016/024988
PCT Pub. Date: Feb. 18, 2016

(65) Prior Publication Data
US 2017/0278534 A1 Sep. 28, 2017

(51) Int. Cl.
*G11B 7/00* (2006.01)
*G11B 7/0065* (2006.01)
(Continued)

(52) U.S. Cl.
CPC ........ *G11B 7/0065* (2013.01); *G11B 7/00772* (2013.01); *G11B 7/13* (2013.01)

(58) Field of Classification Search
CPC ............ G11B 20/1883; G11B 2220/20; G11B 27/105; G11B 27/329; G11B 7/0065; G11B 7/083
(Continued)

(56) References Cited

U.S. PATENT DOCUMENTS

2006/0279824 A1* 12/2006 Riley ................... G11B 7/0065
359/35
2007/0024867 A1 2/2007 Mater
(Continued)

*Primary Examiner* — Nabil Hindi
(74) *Attorney, Agent, or Firm* — Stuart H. Mayer; Mayer & Williams PC

(57) ABSTRACT

An optical information recording apparatus and method thereof for recording information in a holographic medium. The apparatus includes a laser source which generates a reference beam and a signal beam to record the information in the holographic medium, a sensor which detects a vibrational amplitude over a time period applied to the optical information processing apparatus for recording the information, an operational circuit which calculates from the vibrational amplitude at least one statistical measure of the vibrational amplitude; and a processor programmed to control a recording mode such that the processor evaluates the calculated statistical measure to determine continuation of a recording operation to the holographic medium.

19 Claims, 12 Drawing Sheets

(51) Int. Cl.
*G11B 7/007* (2006.01)
*G11B 7/13* (2012.01)

(58) Field of Classification Search
USPC .................................. 369/103, 47.14, 47.15
See application file for complete search history.

(56) References Cited

U.S. PATENT DOCUMENTS

| | | | |
|---|---|---|---|
| 2007/0183008 A1* | 8/2007 | Kogure | G03H 1/0486 |
| | | | 359/3 |
| 2011/0273754 A1 | 11/2011 | Shimada et al. | |
| 2012/0135338 A1 | 5/2012 | Cole et al. | |
| 2012/0294130 A1* | 11/2012 | Watabe | G11B 7/0065 |
| | | | 369/44.33 |
| 2013/0077457 A1 | 3/2013 | Usui et al. | |

* cited by examiner

OPTICAL INFORMATION RECORDING APPARATUS AND METHOD

BACKGROUND OF THE INVENTION

Field of the Invention

The present invention is related to an apparatus and a method which can record and/or reproduce information on an optical information recording medium by using holography.

Description of the Related Art

Through a BLU-RAY DISC™ specification using a blue-violet semiconductor laser, at present, commercialization of an optical disk having recording density of about 100 GB is presently performed. From now on, large capacity greater than 500 GB is expected from optical disk recording. However, for realizing the above-described ultra-high density by using an optical disk, a high-density technology is needed through another method which is different from a high-density technology using the conventional short wavelength and high numerical aperture of an objective lens to form pits as an implementation of a digitally encoded data stream.

Holographic Data Storage System (HDSS) has been considered as one of promising candidates for future Optical Data Storage (ODS) systems. In this approach, holograms are recorded as an interference pattern inside a photo sensitive medium by using a signal beam and a reference beam. The signal beam is modulated two-dimensionally typically by a spatial light modulator (SLM) and converged in a medium when Fourier Transform recording geometry is employed. The converging signal beam is overlapped with the reference beam in the medium. Thus, an image bearing interference patterns is generated. The interference pattern is recorded in the photo sensitive medium as a hologram. High density recording is feasible in this approach. For example, in angular multiplexing, HDSS can records numerous holograms in the same space by changing the reference beam angle. High data transfer rate is feasible because millions of bits are recorded and reproduced at once by SLM and camera. HDSS can record an encoded data page with a few million pixels with a single light pulse. Furthermore, hundreds of data pages can be multiplexed at the same location in the media. Thus, HDSS has a high possibility of becoming a Post BD system.

However, tolerances of HDSS to physical perturbation such as mechanical instability need to be stringent in return for the associated high density recording. Especially, the tolerances of HDSS using angularly multiplexed recording will be stringent because of the narrow Bragg selectivity associated with the utilized off-axis optical configuration and thick volume recording materials.

SUMMARY OF THE INVENTION

In one embodiment of the present invention, there is provided an optical information processing apparatus for recording information in a holographic medium. The apparatus includes a laser source which generates a reference beam and a signal beam to record the information in the holographic medium, a sensor which detects a vibrational amplitude over a time period applied to the optical information processing apparatus for recording the information, an operational circuit which calculates from the vibrational amplitude at least one statistical measure of the vibrational amplitude; and a processor programmed to control a recording mode such that the processor evaluates the calculated statistical measure to determine continuation of a recording operation to the holographic medium.

In one embodiment of the present invention, there is provided a method of processing information in a holographic medium. The method comprises detecting a vibration amplitude as a function of time applied to the above-noted apparatus, and calculating at least one statistical measure of the vibrational amplitude.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

U.S. Pat. Appl. No. 20070183008 (the entire contents of which are incorporated herein by reference) describes a vibration detection apparatus, a hologram apparatus, a vibration detection method for the vibration detection apparatus and a recording method for the hologram apparatus capable of controlling the laser beam irradiation from the laser device into the hologram recording medium in response to the level of vibrations. The described technique in the prior art stops the recording using the direct measurement of the vibration amplitude, which causes unnecessary stops and leads to a reduction of recording speed.

Unlike this prior art, the inventors of this application have discovered that the diffraction efficiency of a hologram recorded under vibrations has a strong relationship with a probability mass function and/or a probability density function of the vibration amplitude. This discovery means that unnecessary stops can be avoided by the invention detailed below which provides one or more reliable optical information recording apparatuses and methods of recording therewith.

First Embodiment

Figure 1:
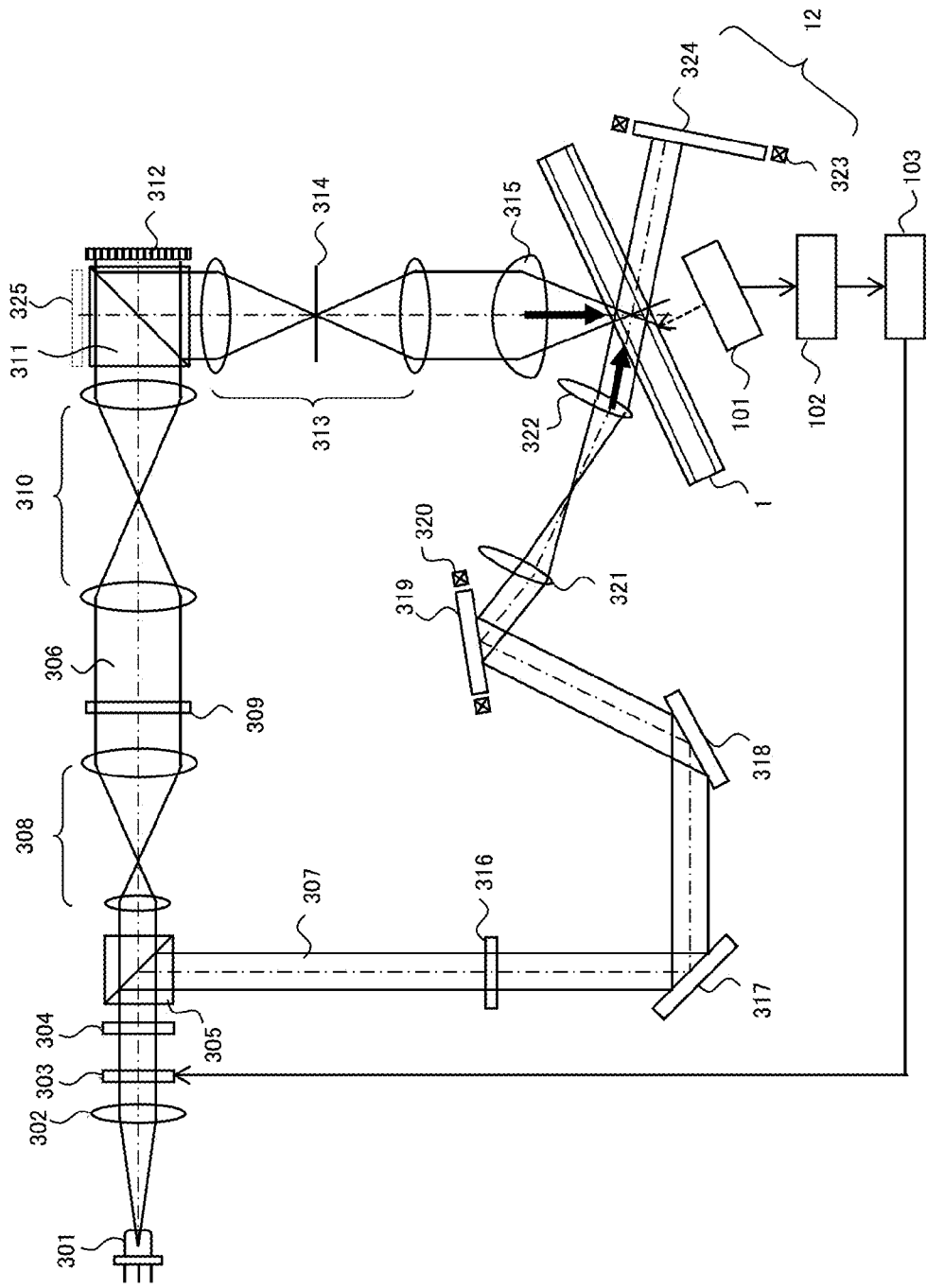
FIG. 1 is a schematic illustrating a recording principle of an example of a basic optical system in the optical information recording/reproducing apparatus.

A first embodiment of the invention will be described with reference to FIG. 1. FIG. 1 shows a recording principle of an example of a basic optical system in the optical information recording/reproducing apparatus. A light beam emitted from a variable wavelength laser 301 of an external resonator type (as an example of a light source) is collimated by a collimating lens 302 and directed to a shutter 303. When the shutter 303 is opened, the light beam is passed through the shutter 303 and through an optical element 304 formed, for example, as a ½ wavelength plate. The optical element 304 provides polarization direction control so that a beam ratio of P and S polarization becomes a desired value, and then the beam is directed into the PBS (Polarization Beam Splitter) prism 305.

One light beam passed through the PBS prism 305 works as a signal beam 306. The light beam is enlarged in diameter by a beam expander 308, is passed through a phase mask 309, a relay lens 310 and a PBS prism 311, and then is directed to a spatial light modulator 312.

A signal beam having information added by the spatial light modulator 312 is reflected by the PBS prism 311, and then propagated to a relay lens 313 and a spatial filter 314. Thereafter, the signal beam is focused on the optical information recording medium 1 by an objective lens 315.

Meanwhile, another light beam reflected by the PBS prism 305 acts as a reference beam 307. Reference beam 307 in this example is set by a polarization direction conversion element 316 to have a predetermined polarization direction according to the recording or reproducing mode, and is reflected by mirror 317 and mirror 318. Then the reference beam 307 is directed to a galvanometer mirror 319. Since the galvanometer mirror 319 can be adjusted in angle by an actuator 320, the incident angle of the reference beam passed through a lens 321 and a lens 322 with respect to the optical information recording medium 1 can be set at a desired angle. In this connection, in order to set the incident angle of the reference beam, another element for redirecting the reference beam may be employed in place of the galvanometer mirror.

For example, a mechanical actuator such as a bimorph type actuator can be used instead of the galvanometer mirror actuator. However, this type of mechanical actuator suffers from the similar problem, transient vibrations upon actuating/stopping motions. A non-mechanical beam steering apparatus such as a liquid crystal (LC) beam steering device, an electro-optic (EO) beam deflector, or an acousto-optic (AO) beam deflector are available and suitable for this invention. Micro-electro-mechanical-system (MEMS) based beam steering devices, for example, digital micro mirror devices from Texas Instruments, the Grating Light Bulb from Silicon Light Machines, the adaptive optics device from Alpao and Boston instruments are available and are also suitable for this invention. However, none of those non-mechanical beam deflectors nor the MEMS-based ones has a comparable performance to the mechanical type actuators in terms of wide beam deflection angles over +/−20 degrees, number of resolvable spots, and optical efficiency. Furthermore, these systems can also be susceptible to transient vibrations arising from other various sources. Therefore, solving the transient vibration problem is important for current high density and high data transfer rate holographic data storage systems employing angular multiplexing.

When the signal beam and the reference beam are directed onto the optical information recording medium 1 to be overlapped with each other in this way, an interference fringe pattern is formed within the recording medium, and a pattern is written in the recording medium where local regions of constructive interference cause a phase change in the recording medium, thereby recording the information as a modulation of the index of refraction induced by the phase change. Further, since the incident angle of the reference beam directed to the optical information recording medium 1 can be changed by the galvanometer mirror 319, angle multiplexing recording can be achieved.

With respect to holograms recorded in the same area with varied reference beam angles, a hologram corresponding to each reference beam angle will be referred to as a page, and a set of pages angle-multiplexed in the same area will be referred to as a book, hereinafter.

In the optical system described above, the vibration amplitude in the direction of rotation of the disk is detected by a sensor 101. The example of sensor 101 is an optical encoder composed of an optical pattern embedded in the disk and a light source and photo detector array. Then statistical measures of the detected vibration amplitude are calculated by an operational circuit 102. Examples of the statistical measures include root mean square (RMS) value, standard deviation, and average of absolute value, which are described in detail later. However, statistical measures are not limited to these values, and any kind of statistical measures are usable. If the statistical measures exceed a predefined threshold, a controlling processor 103 stops recording by closing the shutter 303.

Figure 2:
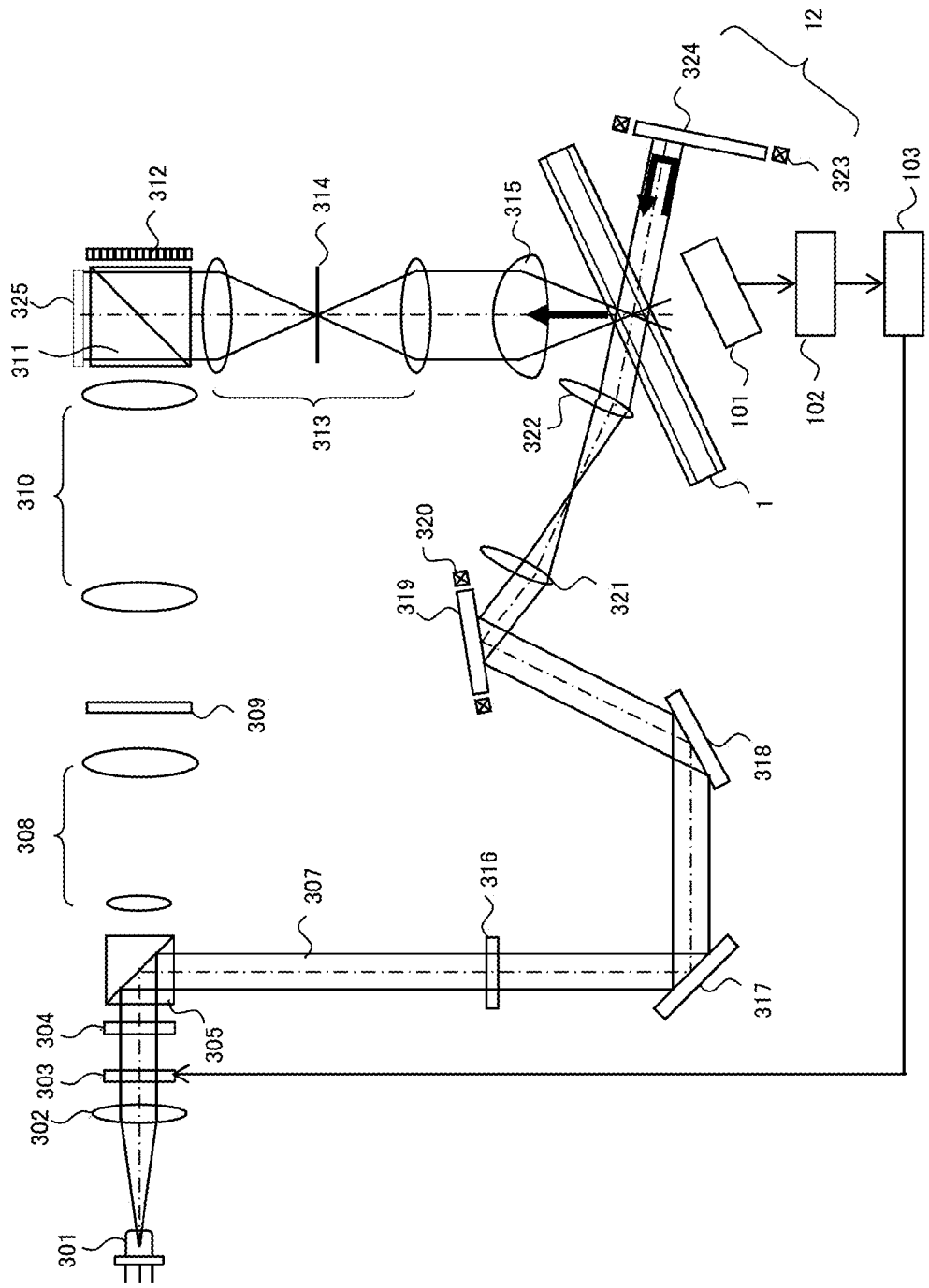
FIG. 2 is a schematic illustrating a reproduction principle of an example of a basic optical system in the optical information recording/reproducing apparatus.

FIG. 2 shows a reproduction principle of an example of a basic optical system in the optical information recording/reproducing apparatus of this invention. When it is desired to reproduce recorded information, reference beam 307 is directed to the optical information recording medium 1. Light from the reference beam 307 passes through the optical information recording medium 1 and is reflected by galvanometer mirror 324, which is angle-adjustable by an actuator 323. Thus, the optical system generates a reproduction reference beam (depicted by the arrow extending from medium 1 to objective lens 315) which propagates against the recording reference beam.

The reproduction reference beam is diffracted by the hologram within the recording medium and propagates toward the objective lens 315, the relay lens 313, and then the spatial filter 314. Thereafter, the reproduction light is passed through the PBS prism 311, and then directed to an optical detector 325 to reproduce the recorded signal. Though an image sensor such as a CMOS pixel array or a CCD imaging device can be used as the optical detector 325, the optical detector may be any element as long as the element can reproduce the page data.

The present invention utilizes a method of stopping recording at the appropriate timing in order to avoid the adverse effects of the mechanical vibrations occurring during the recording of a hologram. As noted above, the present inventors have discovered that the effect of mechanical vibration is highly related to a probability mass function of the vibration amplitude as follows.

Figure 3:
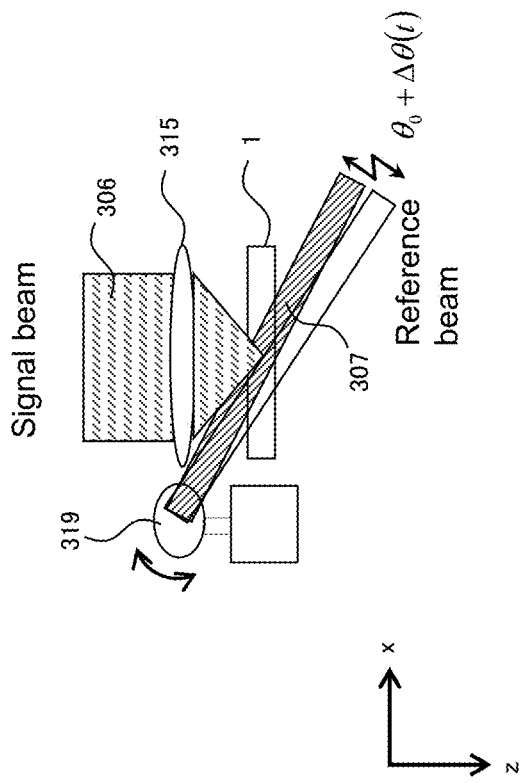
FIG. 3 is a schematic diagram of oscillation of the reference beam angle due to the instability of the mirror angle of a galvanometer.

The mechanical instability of the mirror angle of a galvanometer induces oscillation of reference beam angle $\Delta\theta(t)$ (see FIG. 3). How the oscillation of reference beam angle $\Delta\theta(t)$ affects reproduced beam is explained below in the following illustrative, non-limiting explanation. When a reference beam $R_w$ is considered as a plane wave having a DC component of incident angle with respect to a holographic medium which is $\theta_0$, the complex amplitude of reference beam in the medium can be expressed by:

$$R_w = A \cdot \exp\left[j\frac{2\pi}{\lambda}\left\{\sin(\theta_0 + \Delta\theta(t)) \cdot x + \sqrt{n^2 - \sin^2(\theta_0 + \Delta\theta(t))} \cdot z\right\}\right], \quad (1)$$

where n is an index of refraction in the medium, $\lambda$ is a wavelength, A is a constant of complex value, the z-axis is chosen perpendicular to the surface of the holographic medium, and the x-axis is parallel to the medium. The x-z plane is the plane of incidence of the reference beam. While other parameter characterizations are possible in this invention (e.g., depending on the degree of approximation used), under the condition that $\Delta\theta(t)$ is a small oscillation and of the order of sub-degree, one can consider cos $\Delta\theta(0=1$, sin $\Delta\theta(t)=\Delta\theta(t)$ and neglect $\Delta\theta(t)^2$ or higher terms. As a result, Eq. (1) can be rewritten by $$R_w = A \cdot \exp\left\{j\frac{2\pi}{\lambda}\left(\sin\theta_0 \cdot x + \sqrt{n^2 - \sin^2\theta_0} \cdot z\right)\right\} \cdot \exp \quad (2)$$

$$\left\{j\frac{2\pi}{\lambda}\cos\theta_0(x - z \cdot \tan\theta_0') \cdot \Delta\theta(t)\right\},$$

where $\theta_0, \theta_0'$ are the angle of reference beam in air and inside the recording medium, respectively. Note that $\theta_0'$ is given by $\sin^{-1}(\sin(\theta_0)/n)$.

The first exponential term in Eq. (2) denotes a plane wave without oscillation whose incident angle is $\theta_0$. The hologram recorded utilizing the above reference beam is a time average hologram over recording exposure time $t_r$. The inventors have recognized the following parameter $f_{wf}$ as a weighting factor which indicates an oscillation effect due to an inadvertent oscillation of reference beam angle during the recording or writing of the page data to the recording medium 1.

$$f_{wf} = \frac{1}{t_r}\int_0^{t_r} \exp\left\{j\frac{2\pi}{\lambda}\cos\theta_0(x - z \cdot \tan\theta_0') \cdot \Delta\theta(t)\right\}dt, \quad (3)$$

Figure 12:
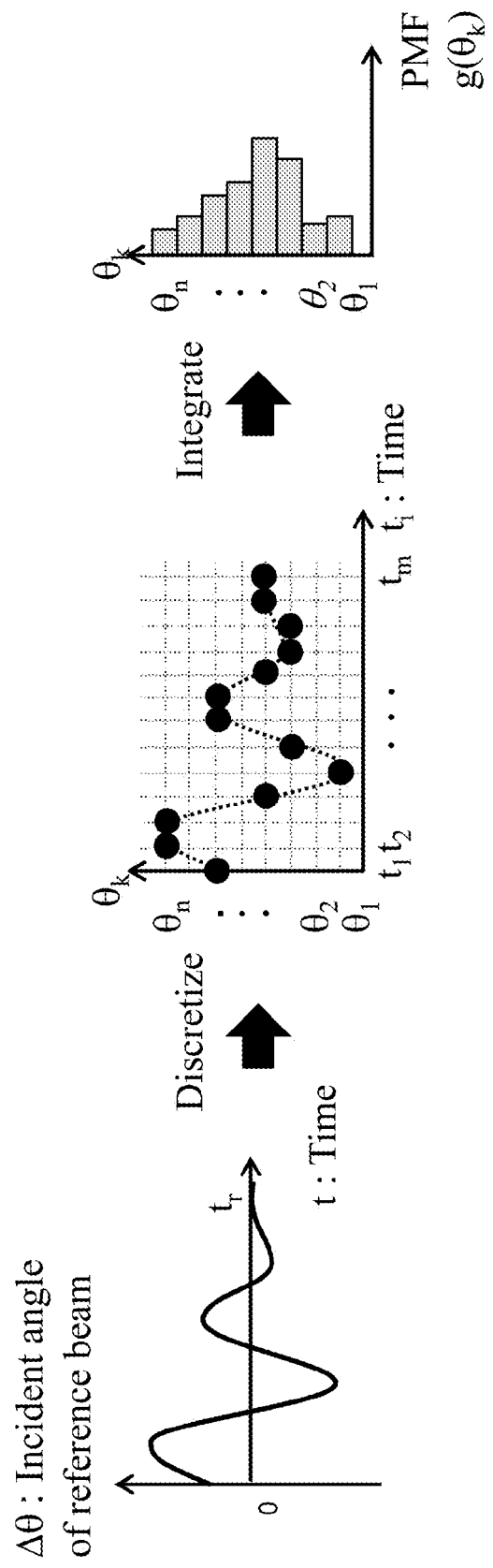
FIG. 12 is a schematic illustration of an interpretation of time-average holography.

Eq. (3) means that the oscillation effect is the time-average of the exponential term. Therefore, when a vibration waveform is discretized, it does not matter if an amplitude at a certain time is exchanged with another amplitude at another certain time. In other words, holographic recording under vibration is a memory-less process. Therefore, the time information of the vibration waveform does not have significant meaning; however, the time integrated distribution of the vibration waveform determines the weighting factor $f_{wf}$. The integrated function of the distribution is referred to herein as a probability mass function (PMF). FIG. 12 shows this interpretation of the time-averaged nature of the holographic recording process under mechanical vibrations.

Next, this interpretation is confirmable via equations where $\Delta\theta(t)$ is expressed by discretized values $\{\theta_1, \theta_2, \ldots\}$ and t is discretized $t_i$ (i=1, 2, . . . , m) which has time period $\Delta t$ (=$t_i - t_{i-1}$). Then the PMF of $\Delta\theta(t)$ is described as $$g(\theta_k) = P(\theta = \theta_k) = \frac{1}{m}\sum_{i=1}^{m} \delta_{\Delta\theta(t_i)\theta_k}, \quad (4)$$

where the $\delta$ is Kronecker delta, $$\delta_{\theta(t_i)\theta_j} = \begin{cases} 1 & (\Delta\theta(t_i) = \theta_j) \\ 0 & (\Delta\theta(t_i) \neq \theta_j) \end{cases}. \quad (5)$$

By discretizing weighting factor (3), and using Eq. (4) and Eq. (5), one obtains:

$$f_{wf} = \frac{1}{m\Delta t}\sum_{i=1}^{m}\exp\left(j\frac{2\pi}{\lambda}\cos\theta_0(x - z \cdot \tan\theta_0') \cdot \Delta\theta(t_i)\right) \quad (6)$$

$$= \frac{1}{m\Delta t}\sum_{i=1}^{m}\sum_{k=1}^{n}\exp\left(j\frac{2\pi}{\lambda}\cos\theta_0(x - z \cdot \tan\theta_0') \cdot \theta_k\right) \cdot \delta_{\theta(t_i)\theta_j}$$

$$= \frac{1}{m\Delta t}\sum_{k=1}^{n} g(\theta_j) \cdot \exp\left(j\frac{2\pi}{\lambda}\cos\theta_0(x - z \cdot \tan\theta_0') \cdot \theta_k\right).$$

From Eq. (6), weighting factor $f_{wf}$ is expressed by the PMF multiplied by the phase term, and the time component vanishes, which verifies that the PMF of the vibration waveform, and not the time information of the vibration waveform, provides the better quantitative measure of the effect of vibration on the holographic recording and readout process.

A probability density function (PDF) is also usable in lieu of the PMF. A PMF is a function that gives the probability of discrete variables. A PDF is a function that gives the probability of continuous variables. Therefore, the PDF for continuous variables essentially describes the same statistics as the PMF for discrete variables. The PMF is used in the case that the sampled amplitude is discretized and processed by a digital circuit, whereas the PDF is used in the case that the sampled amplitude is processed as continuous values by an analog circuit.

Figure 9:
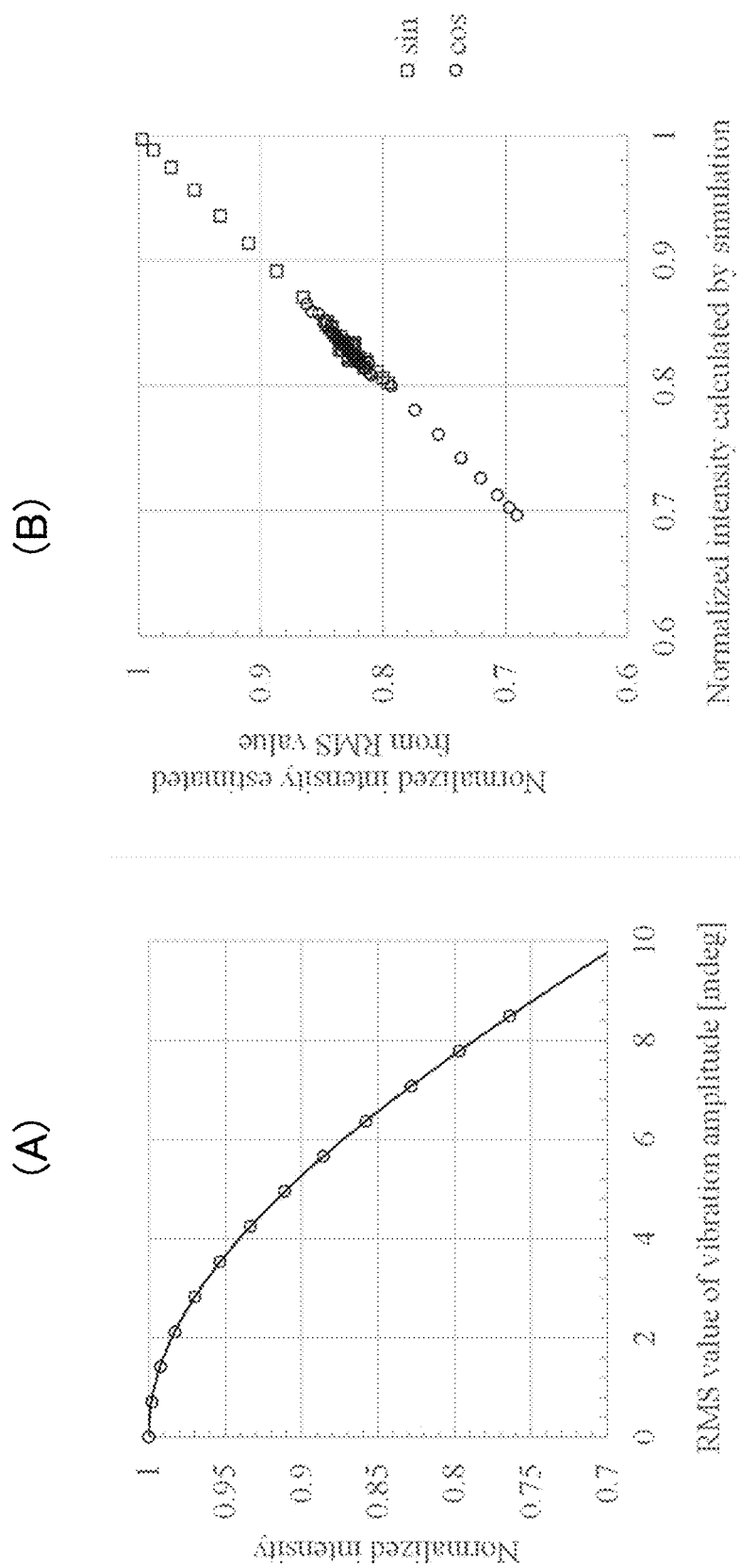
FIG. 9A is a graph depicting the relationship between the RMS value of the vibration amplitude in the plane of the reference beam angle deviation and normalized intensity of the reproduced hologram.
FIG. 9B is a graph depicting the relationship between normalized intensity calculated by simulation and estimated from RMS value when the vibration direction is in the plane of the reference beam angle.

The vibration effect in the plane of the reference beam angle deviation was simulated. FIG. 9A shows the relationship between RMS value of vibration amplitude and normalized intensity. RMS is one of the indexes of PMF and/or PDF. This result was obtained by changing the amplitude of the simple harmonic wave which has one cycle length. From this result, the approximation formula between RMS value and normalized intensity was obtained. For example, if the system can allow a 5% decrease of intensity, which means normalized intensity is 0.95, the allowable RMS value of vibration amplitude is defined as 3.6 mdeg from FIG. 9A. This RMS value can be used for a predefined threshold which is described later, but this value of 5% can change according to system margin design. The allowable normalized intensity decrease is typically less than 50% although greater values in some circumstances may be acceptable.

Then the normalized intensity of the reproduced image (with the various initial phase and duration of vibrations using the approximation formula and RMS value) was estimated. The relationship between normalized intensity calculated by simulation and normalized intensity estimated from the RMS value is shown in FIG. 9B. The estimated values agree with the simulation values.

Figure 10:
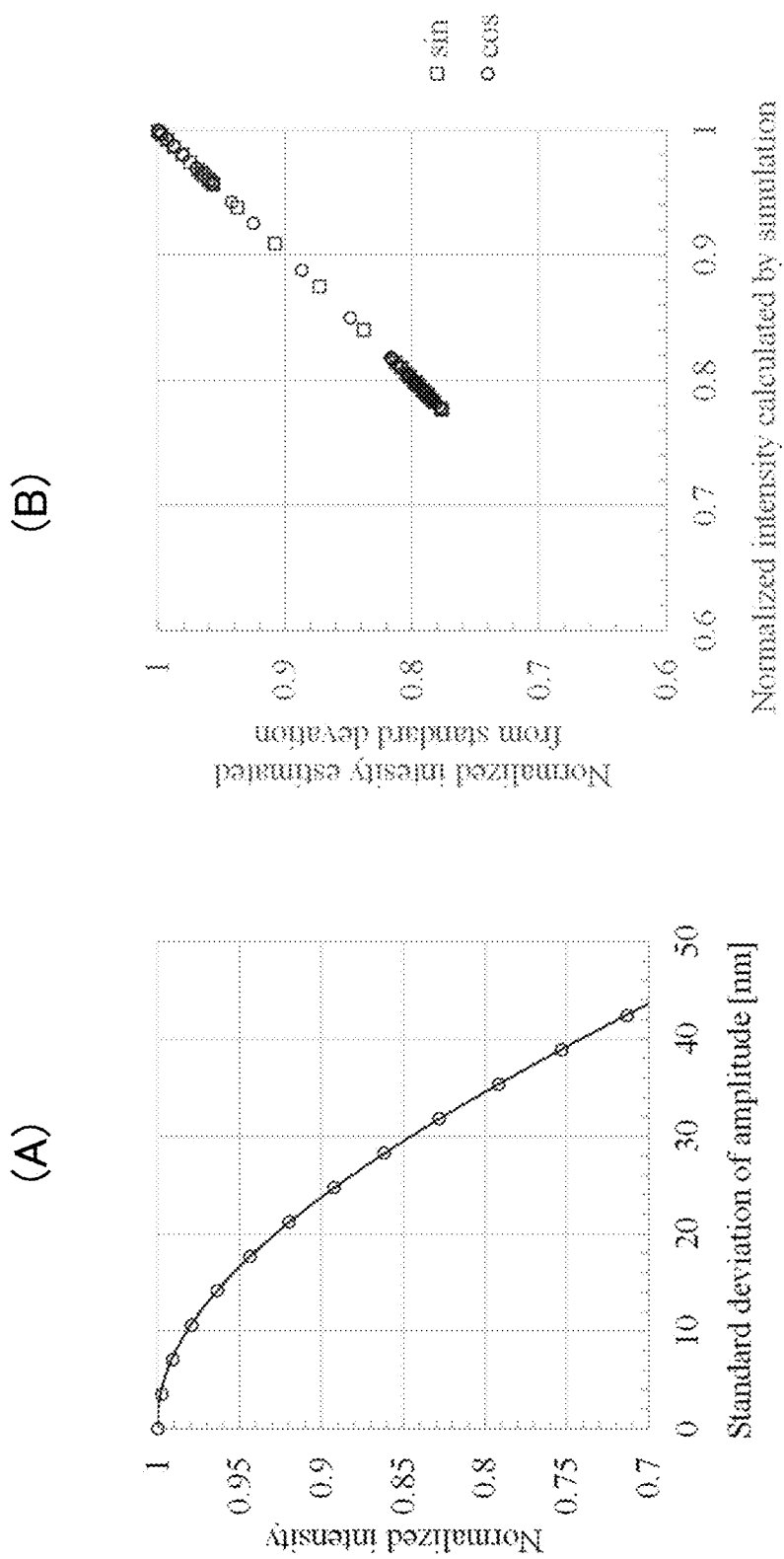
FIG. 10A is a graph depicting the relationship between standard deviation of vibration amplitude in the tangential direction of the disk rotation and normalized intensity of reproduced hologram.
FIG. 10B is a graph depicting the relationship between normalized intensity calculated by simulation and estimated from RMS value when the vibration amplitude is in the tangential direction of the disk rotation.

The vibrational effect in the disk rotation direction was also simulated. FIG. 10A shows the relationship between the standard deviation of vibration amplitude and the normalized intensity in the case of disk rotation vibration. Standard deviation is one of the indexes of PMF and/or PDF. From this result, the approximation formula between standard deviation of vibration amplitude and normalized intensity was obtained. For example, if the system can allow a 5% decrease of intensity, which means normalized intensity is 0.95, the allowable standard deviation of the vibration amplitude is defined as 16 nm from FIG. 10A. This value changes according to system margin design. This standard deviation can be used for a predefined threshold which is described later, but this value of 16 nm can also change according to system margin design.

Then, the normalized intensity of a reproduced image (with various initial phase and duration of the cycle using the approximation formula and the standard deviation) was estimated. The relationship between normalized intensity calculated by simulation and normalized intensity estimated from standard deviation is shown in FIG. 10B. The estimated values agree with simulation values.

The RMS value and standard deviation of PMF is calculated as follows. The RMS value is described as $$\Delta\theta_{RMS} = \sqrt{\frac{1}{m}\sum_{i=1}^{m}\Delta\theta(t_i)^2} . \quad (7)$$

The average value of vibration amplitude is described as $$\Delta\theta_{AVE} = \frac{1}{m}\sum_{i=1}^{m}\Delta\theta(t_i). \quad (8)$$

Then the standard deviation is calculated as $$\Delta\theta_{SD} = \sqrt{\frac{1}{m}\sum_{i=1}^{m}(\Delta\theta(t_i) - \Delta\theta_{AVE})^2} , \quad (9)$$

which means the standard deviation is the RMS value with reference to the average value.

To simplify the calculation, the sum of absolute value can be used. Instead of the RMS value, Eq. (10) can be used:

$$\Delta\theta'_{RMS} = \frac{1}{m}\sum_{i=1}^{m}|\Delta\theta(t_i)|. \quad (10)$$

Instead of the standard deviation, Eq. (11) can be used:

$$\Delta\theta'_{SD} = \frac{1}{m}\sum_{i=1}^{m}|\Delta\theta(t_i) - \Delta\theta_{AVE}|. \quad (11)$$

RMS and standard deviation are among the various indexes that define a PMF which is a statistical measure. Therefore, through this analysis, it becomes clear that there is strong correlation between the statistical measure of vibration amplitude and signal quality. Then it is reasonable to use the statistical measure of vibration amplitude to control the recording mode. Statistical measure of vibration amplitude may not be preferred for conventional optical disk drive like BLU-RAY DISC™ because the time period for a bit is shorter than microsecond, making the calculation of an accurate statistical measure in this time period complex. On the other hand, statistical measure of vibration is usable for HDSS which utilize a continuous-wave laser because the time period for a page is generally longer than 100 microsecond, making it relatively easy to calculate statistical measure accurately in this time period.

RMS and standard deviation can be either calculated from PMF or vibration amplitude. Both results are usable in this invention.

Figure 6:
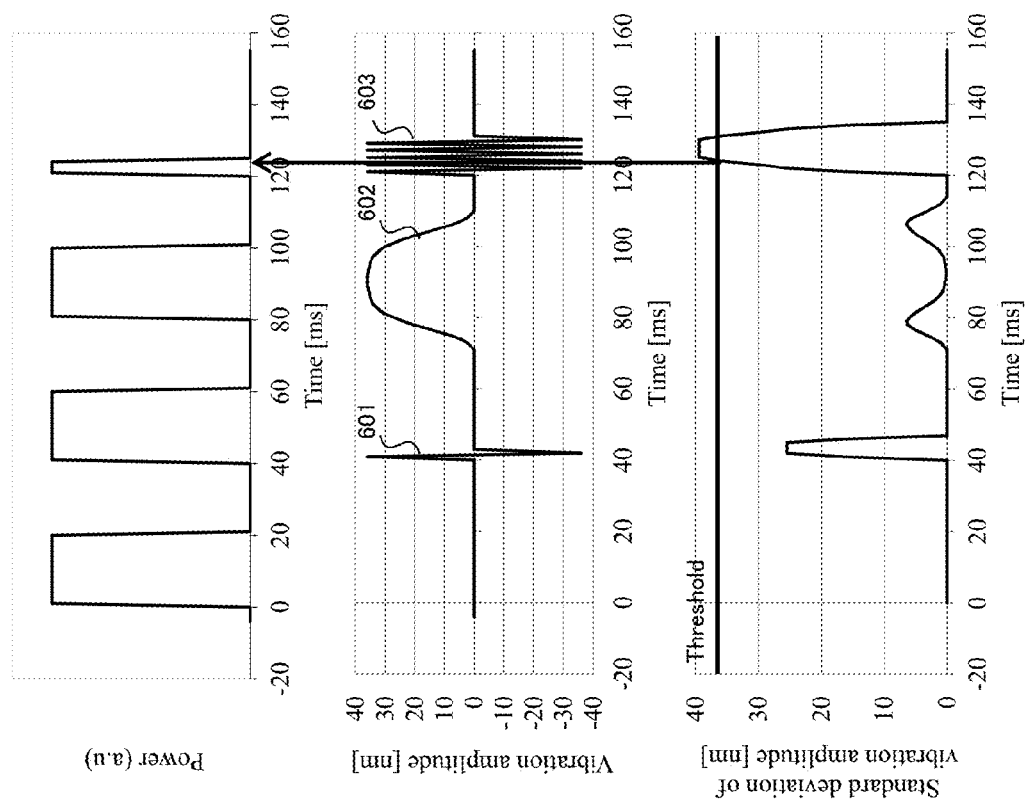
FIG. 6 is a timing chart illustrating an example of an operation during recording regarding the first embodiment.

FIG. 6 shows the example of the developed recording mode control. The vibration amplitude in the disk rotation direction is observed while recording, and the standard deviation of vibration amplitude is calculated in real time. The time period to calculate the standard deviation is set to be a quarter of the write pulse. Standard deviation is an example of a statistical measure. Vibration 601 is an example of vibration which is high frequency but the period is short. Vibration 602 is an example of a vibration which has a low frequency but where the period is long. The system does not stop recording in these cases, because the standard deviation (e.g. a statistical measure) of the vibration amplitude does not exceed the predefined threshold. Vibration 603 is an example of vibration which has a high frequency and where the period is long. The system stops recording in this case, because the standard deviation of the vibration amplitude exceeds the threshold. The actual standard deviations of vibration 601, vibration 602 and vibration 603 are 11.7 nm, 1.95 nm and 26.1 nm respectively. Therefore, the normalized intensity estimated from the standard deviation for vibration 601, vibration 602 and vibration 603 are 97.54%, 99.97% and 88.0₂%, respectively. This means that the system can stop recording when necessary although the amplitudes of the three vibrations are the same. On the other hand, a conventional system would stop recording with all of the vibration examples shown above because the vibration amplitudes are the same.

The time period to calculate a statistical measure can be either predefined or changed adaptively. If the time period is longer, the accuracy becomes better, but the response time becomes worse. On the other hand, if the time period is shorter, the response time is better, but the accuracy becomes worse.

Vibration amplitudes occurring in the Bragg angle of the reference beam and in the rotation direction of the disk are described above, but this invention can be applied to any other vibration occurring in the degenerate angle of the reference beam, along the radial direction of the disk, along the defocus direction of the disk, and so on. A sensor to detect the vibrations can be assigned to each vibration mode, and controlled individually with different thresholds for each mode. Any appropriate sensor can be applied to detect vibrations such as for example an acceleration sensor, a laser displacement gauge, a capacitance sensor for angle detection in a galvanometer mirror, a CMOS image sensor, etc.

Figure 4:
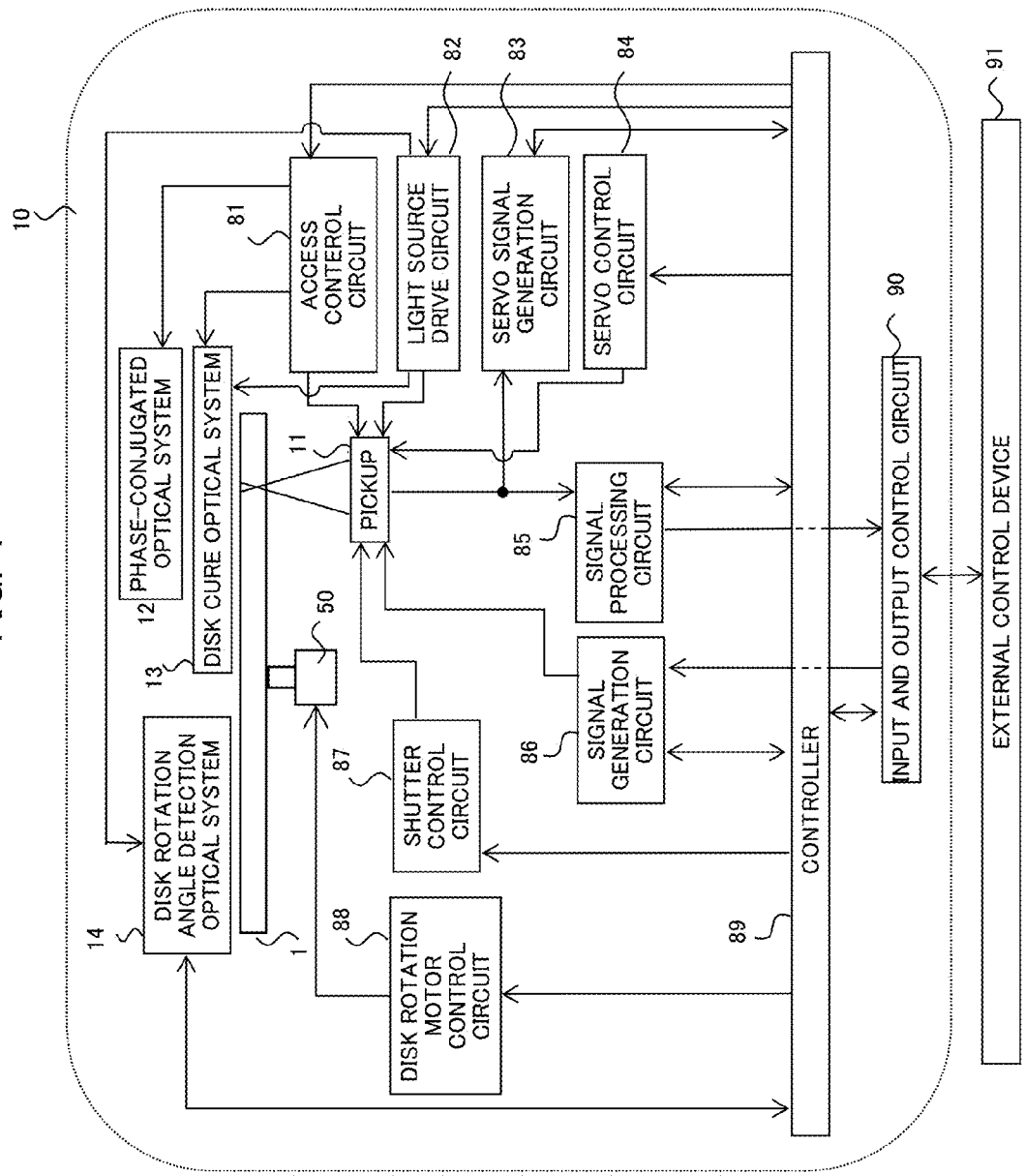
FIG. 4 is a schematic diagram of a block diagram illustrating a recording/reproducing apparatus.

FIG. 4 is a block diagram illustrating a recording apparatus (including an optical information recording medium 1) which records and/or reproduces digital information by using holography. An optical information recording/reproducing apparatus 10 is connected to an external control device 91 via an input and output control circuit 90. In the case of performing a recording operation, the optical information recording/reproducing apparatus 10 receives an information signal to be recorded from the external control device 91 via the input and output control circuit 90. In the case of performing a reproducing operation, apparatus 10 transmits the reproduced information signal to the external control device 91 via the input and output control circuit 90.

The optical information recording/reproducing apparatus 10 includes a pickup 11, a reproduction reference beam phase-conjugated optical system 12, a disk cure optical system 13, a disk rotation angle detection optical system 14, and a rotating motor 50. The optical information recording medium 1 is configured to be rotatable by the rotating motor 50.

Pickup 11 can be composed of all optical components described in FIG. 1, as an example, and plays a role in emitting a reference beam and a signal beam to the optical information recording medium 1 and recording digital information on the recording medium 1 by using holography. In this example, an information signal to be recorded is supplied to a spatial light modulator 312 (FIG. 1) of the pickup 11 via a signal generation circuit 86 by a controller 89, and the signal beam is modulated by the spatial light modulator 312.

One appropriate beam modulation vibration-compensation procedure is described in International application PCT/US14/41438 entitled "OPTICAL INFORMATION RECORDING/REPRODUCING APPARATUS, OPTICAL INFORMATION RECORDING/REPRODUCING METHOD," filed Jun. 7, 2014, the entire contents of which are incorporated herein by reference.

In this beam modulation vibration-compensation procedure, when a recording operation starts, a sensor detects a deviation profile of time dependent deviation of physical condition such as angle and/or position of an optical component and/or an optical beam in the apparatus during recording. The time dependent deviation is a deviation from the nominal angle and/or position produced for example by mechanical vibrations on the optical components of the optical information recording/reproducing apparatus 10 (e.g., the time dependent deviation of the recording beam). Next, a processor (e.g., the controlling processor 103 in FIG. 1 or controller 89 in FIG. 4 or external control device 91 in FIG. 4) relates the deviation profile to either a phase or amplitude profile to be applied to a reference beam to compensate for time dependent deviations of the recording beam. The phase or amplitude profile can be applied to the recording beam by way of an adaptive optics device such as for example the spatial light modulator, noted above.

When reproducing the information recorded in the optical information recording medium 1, a light beam which is made to be incident on the optical information recording medium in a direction opposite to (or the same as) that at the time of recording a reference beam emitted from the pickup 11 is generated by the reproduction reference beam phase-conjugated optical system 12. The reproduction reference beam is detected by a detector of pickup 11, and a signal is reproduced by a signal processing circuit 85.

The opening and closing time in a shutter of pickup 11 is controlled through a shutter control circuit 87 by the controller 89, and through the process, irradiation time of the reference beam and signal beam irradiated on the optical information recording medium 1 can be adjusted.

The disk cure optical system 13 plays a role in generating a light beam for use in a pre-cure process and a post-cure process of the optical information recording medium 1. When information is recorded on a desired position of the optical information recording medium 1, often a pre-cure process precedes the recording in which a predetermined light beam irradiates the medium before the reference beam and signal beam irradiate the desired position on the medium. The post-cure process is a subsequent process in which after information is recorded on a desired position of the optical information recording medium 1, a predetermined light beam irradiates the medium on the desired position to prevent the reference and signal beams from writing over the previously recorded information. Pre-cure is needed to minimize shrinkage of the material which degrades both of SNR and signal level of the reproduced signal. By post-cure, all the dynamic range of the material is consumed. As a result recorded information is not alterable by additional exposures after all the recording process is completed.

The disk rotation angle detection optical system 14 is used to detect a rotation angle (i.e., the incident angle for the writing of one page of data) of the optical information recording medium 1. When the optical information recording medium 1 is adjusted to a predetermined rotation angle, a signal indicating the rotation angle is detected by the system 14. By using the detected signal, the rotation angle of the medium 1 can be controlled through a disk rotation motor control circuit 88 by the controller 89.

From a light source drive circuit 82, a predetermined light source drive current is supplied to light sources of the pickup 11, the disk cure optical system 13, and the disk rotation angle detection optical system 14, thus permitting each light source to emit a light beam with a predetermined light intensity.

Further, a servo mechanism for generating a signal for servo control in the signal generation circuit 83 and correcting the deviation amount through a servo control circuit 84 can be provided on the optical information recording/reproducing apparatus 10.

The detector 101, the operational circuit processor 102 and the controlling processor 103 in FIG. 1 may be included in either block in FIG. 4.

Also, apparatus 10 has a translation mechanism capable of sliding a position of the optical pickup 11 or the medium 1 in the radial direction of the optical information recording medium 1, with position control undertaken by the access control circuit 81.

In pickup 11, the disk cure optical system 13, and the disk rotation angle detection optical system 14, several optical system configurations or all the optical system configurations may be integrated into one configuration for simplicity.

Figure 5:
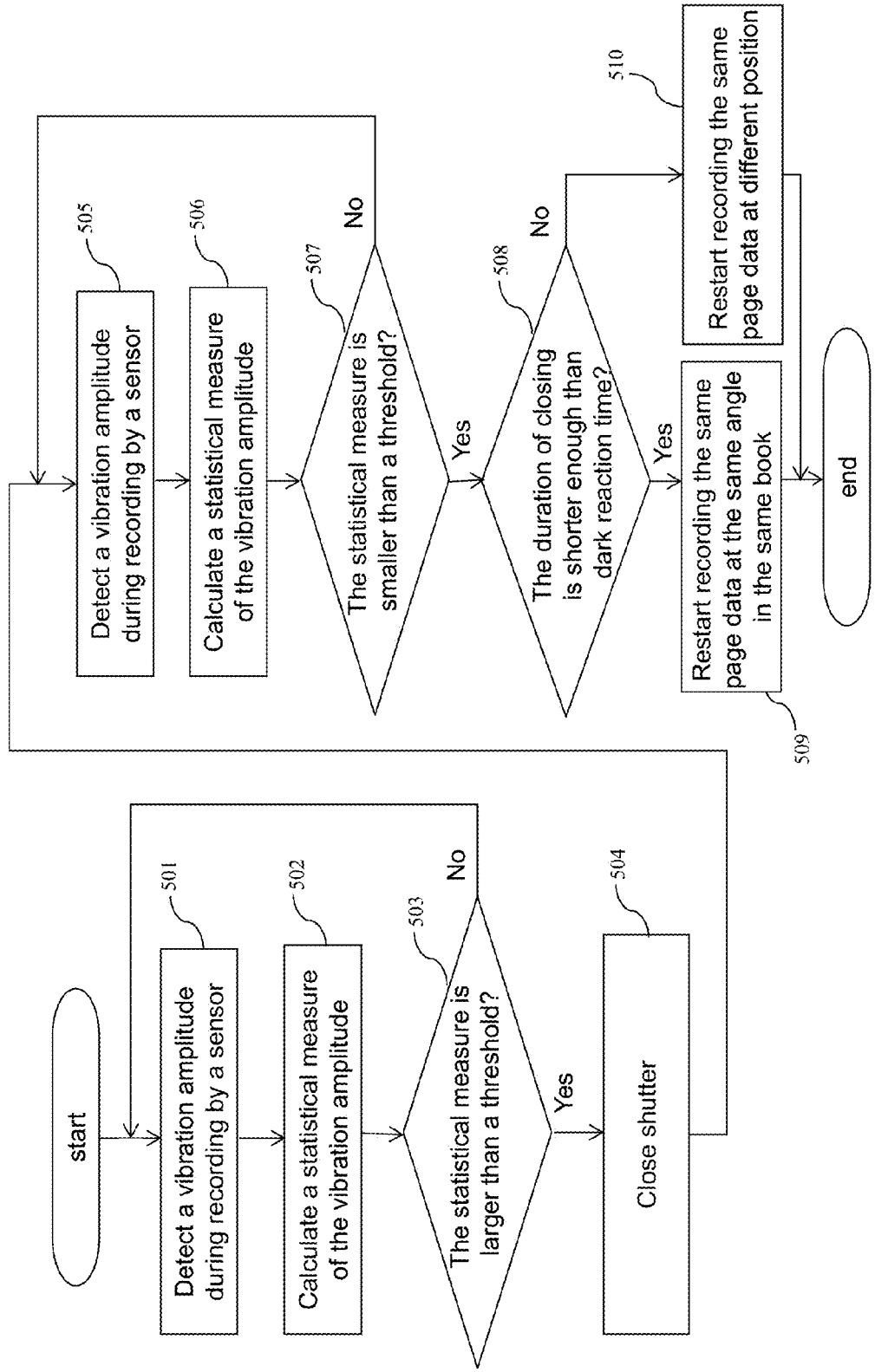
FIG. 5 is a schematic diagram of embodiments of a flow of an operation during recording regarding a first embodiment.

FIG. 5 is schematic diagram depicting an example of a flowchart of operation. When a recording operation starts, a sensor detects a vibration amplitude of an optical component and/or an optical beam in the apparatus during recording (501). Next, an operational circuit (e.g., signal processing circuit 85 or input and output control circuit 90 in FIG. 4, a programmed component of controller 89 in FIG. 4 or external control device 91 in FIG. 4) calculates at least one statistical measure of the vibration amplitude (502). Then, a controlling processor (e.g., controller 89 in FIG. 4 or external control device 91 in FIG. 4) judges whether the statistical measure(s) is larger than a predefined threshold (503). If the statistical measure(s) is larger than the threshold, the controlling processor closes the shutter to stop recording (504). If the statistical measure is not larger than the threshold, the sensor detects the vibration amplitude again.

Accordingly, in the first embodiment, there exists an optical information recording apparatus and method thereof for recording information in a holographic medium. The apparatus includes a laser source which generates a reference beam and a signal beam to record the information in the holographic medium, a sensor which detects a vibrational amplitude over a time period applied to the optical information processing apparatus for recording the information, an operational circuit which calculates from the vibrational amplitude at least one statistical measure of the vibrational amplitude; and a processor programmed to control a recording mode. The processor evaluates the calculated statistical measure to determine continuation of a recording operation to the holographic medium.

As used herein, a "circuit" includes hardware and/or software to perform the functions described for the identified circuit. The circuit can include (as described later) necessary components to input data (e.g., vibrational information such as amplitude), process or transform the data (e.g., change the vibration amplitude into one or more of the described statistical measures), and output the transformed data. The computer implemented section below describes a number of circuit configurations suitable for this invention.

As used herein, a "processor programmed to" is a processor which includes either hardware and/or software configurations to accomplish the described function. The computer implemented section below describes a number of programmable and storage elements suitable for this invention.

After recording is stopped, the sensor detects a vibration amplitude of an optical component and/or an optical beam in the apparatus during recording (505) and an operational circuit calculates statistical measure(s) of the vibration amplitude again (506). The controlling processor judges whether the statistical measure(s) is larger than a predefined threshold (507). If the statistical measure(s) is smaller than the predefined threshold, the recording operation is restarted and the same page data can be recorded again. The controlling processor judges whether the duration of the closing of the shutter is shorter than a dark reaction time of the medium (508). The duration of the closing of the shutter corresponds to the period from stopping the recording operation to restarting the recording operation. A "dark reaction" is a reaction which can continue long after the recording of data in the medium has stopped, that is a reaction that continues after the recording light has been shut off. These reactions can occur in free radical, cationic, and anionic initiated and catalyzed photopolymerizations, and if not arrested in time by post curing may obscure the recorded data.

If the duration of the closing of the shutter is shorter than the dark reaction time of the medium, the same page data is recorded at the same angle in the same book (509). This page data can be recorded at a different angle in the same book. If the duration of the closing of the shutter is not short enough than the dark reaction time, the same page data is recorded at a different position (different book) (510). The whole book can be recorded at a different position.

In one variation of this procedure, information related to a vibration amplitude can be used, as in PCT/US14/41438 (noted above), to derive the deviation profile. A processor (as above) relates the deviation profile to either a phase or amplitude profile to be applied to the reading beam to compensate for time dependent deviations of the reading beam.

Second Embodiment

A second embodiment of the invention will be described with reference to FIG. 7 and FIG. 8. In this embodiment, the write exposure time is compensated using a statistical measure of the vibration amplitude. This embodiment is used when the duration of closing of the shutter is shorter enough than the dark reaction time of the medium and the same page is recorded at the same angle in the same book in FIG. 5.

Figure 8:
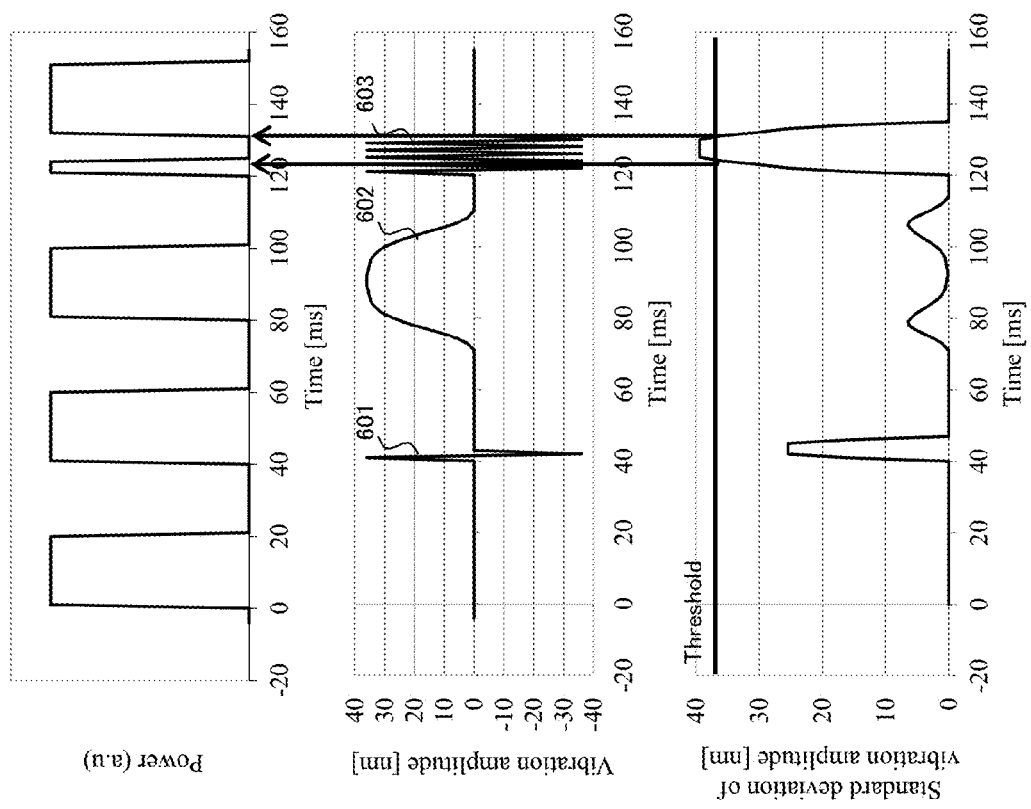
FIG. 8 is a timing chart illustrating an example of an operation during recording regarding the second embodiment.

FIG. 8 shows an example of the developed recording mode control of the present invention. The vibration amplitude is observed while recording and the standard deviation of vibration amplitude is calculated in real time. Standard deviation is an example of an acceptable statistical measure. Other of the statistical measures described above can be used in this embodiment. Vibration 801 is the example of vibration which is high frequency but the period is short. Vibration 802 is the example of vibration which has a low frequency but where the period is long. The system does not stop recording in these cases, because the standard deviation of vibration amplitude does not exceed the threshold. Vibration 803 is the example of vibration which has a high frequency and where the period is long. The system stops recording when the standard deviation of vibration amplitude exceeds the threshold. The system restarts recording when the standard deviation of vibration amplitude falls below the threshold.

Figure 7:
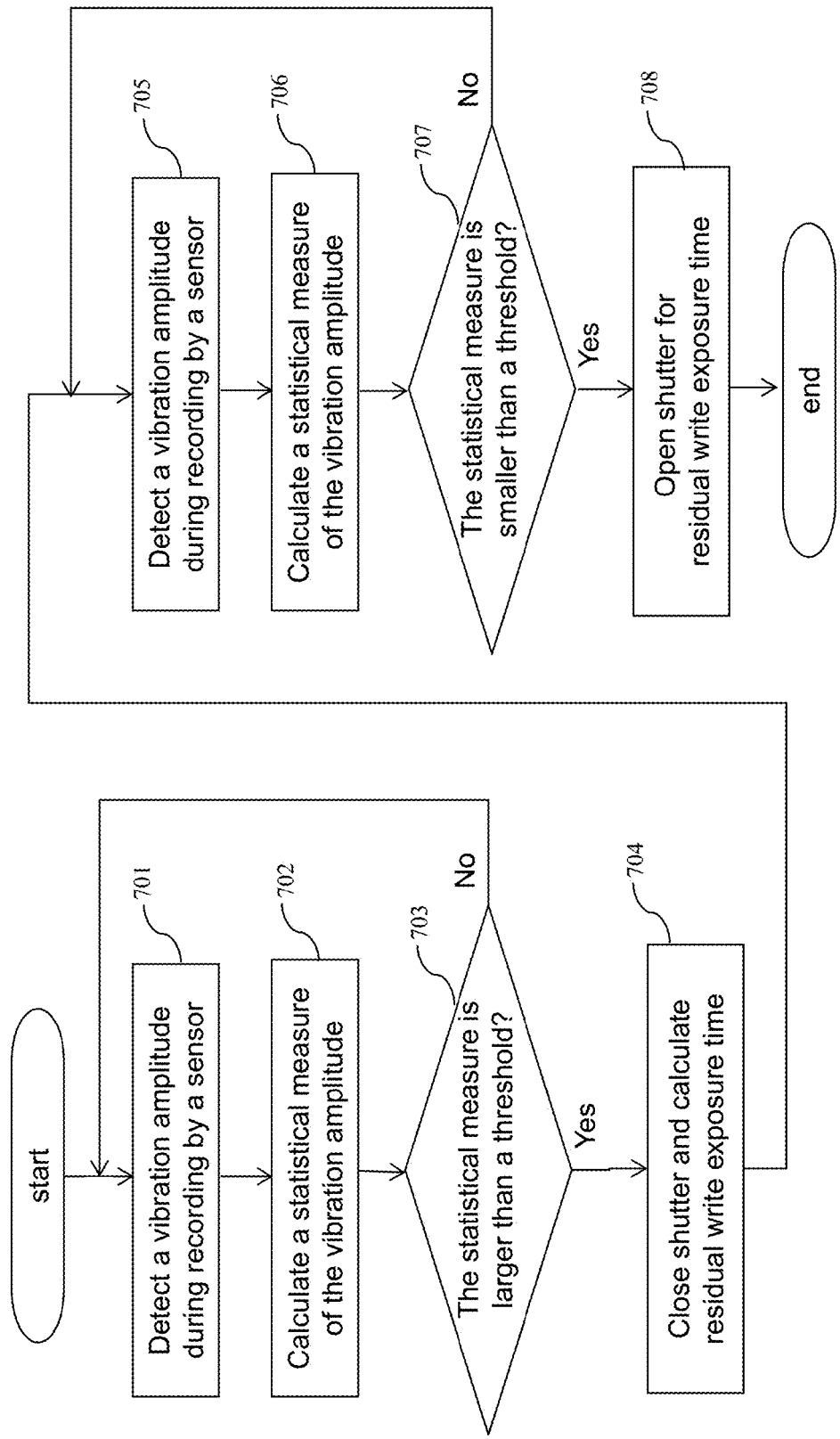
FIG. 7 is a schematic diagram of embodiments of a flow of an operation during recording regarding a second embodiment.

FIG. 7 shows a schematic diagram depicting an example of a flowchart of operation. When a recording operation starts, a sensor detects a vibration amplitude of an optical component and/or an optical beam in the apparatus during recording (701). Next, an operational circuit (e.g., signal processing circuit 85 or input and output control circuit 90 in FIG. 4, a programmed component of controller 89 in FIG. 4 or external control device 91 in FIG. 4) calculates at least one statistical measure of the vibration amplitude (702). Then, a controlling processor (e.g., controller 89 in FIG. 4 or external control device 91 in FIG. 4) determines whether the statistical measure(s) is larger than a predefined threshold (703). If the statistical measure(s) is larger than the predefined threshold, the controlling processor closes the shutter to stop recording and calculate residual write exposure time (704). If the statistical measure(s) is not larger than the threshold, the sensor detects the vibration amplitude again. After recording is stopped, the sensor detects a vibration amplitude of an optical component and/or an optical beam in the apparatus during recording (705) and the operational circuit calculates at least one statistical measure(s) of the vibration amplitude again (706). If the statistical measure(s) is smaller than the threshold (707), the controlling processor opens the shutter for the residual write exposure time (708).

How to define the predefined threshold is the same as the first embodiment. For example, 3.6 mdeg in the plane of the reference beam angle deviation or 16 nm in the disk rotation direction can be used, but this value of 3.6 mdeg changes according to system margin design.

Figure 11:
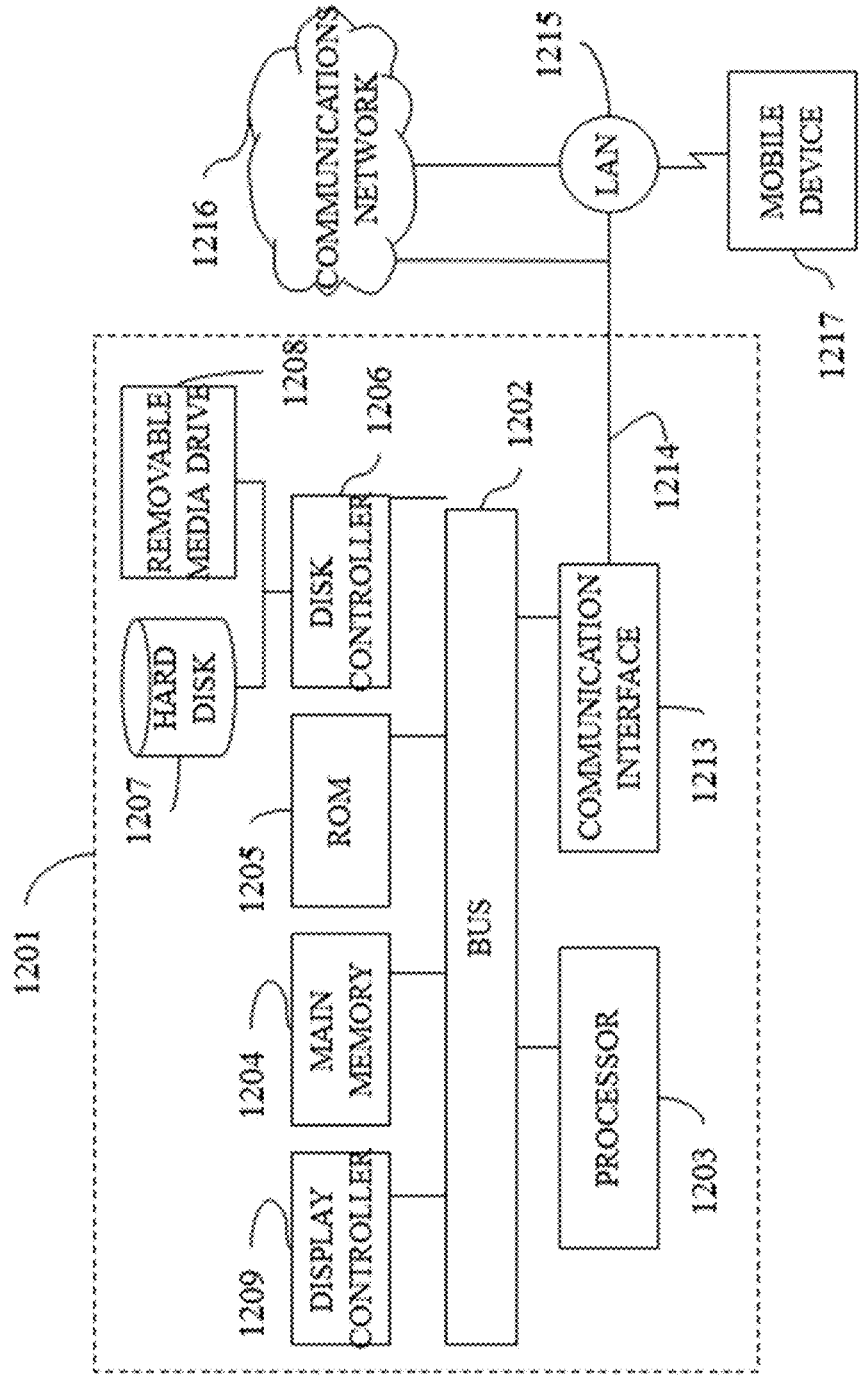
FIG. 11 is a schematic illustration of an exemplary computer system.

Computer-Implementation:

FIG. 11 illustrates a computer system 1201 for implementing various embodiments of the invention. The computer system 1201 may be used to perform any or all of the functions described above. For example, one or more computer systems 1201 can be programmed to perform the embodiments described above with regard to the flow charts (representing algorithmic decisions) in FIGS. 5, and 7 and the embodiments noted above with respect to external control device 91, controller 89, signal generation circuit 86, signal processing circuit 85, and/or the other circuits and controls in FIG. 4. One or more computer systems 1201 can be programmed to perform the embodiments described above with regard to FIGS. 1 and 2 and the sensors and controls described therein. One or more computer systems 1201 can be programmed to perform the embodiments described above with regard to the operational circuit (e.g., signal processing circuit 85 or input and output control circuit 90 in FIG. 4, a programmed component of controller 89 in FIG. 4 or external control device 91 in FIG. 4) and the controlling processor (e.g., controller 89 in FIG. 4 or external control device 91 in FIG. 4).

The computer system 1201 can include a bus 1202 or other communication mechanism for communicating information, and a processor 1203 coupled with the bus 1202 for processing the information. The computer system 1201 can also include a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 can further include a read only memory (ROM) 1205 or other static storage device (e.g., programmable read only memory (PROM), erasable PROM (EPROM), and electrically erasable PROM (EEPROM)) coupled to the bus 1202 for storing static information and instructions for the processor 1203.

The computer system 1201 can also include a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) designed to perform the specific functions noted in the flow charts of FIGS. 5 and 7.

The computer system 1201 may also include a display controller 1209 coupled to the bus 1202 to control a display, such as a cathode ray tube (CRT), for displaying information to a computer user. The computer system includes input devices, such as a keyboard and a pointing device, for interacting with a computer user and providing information to the processor 1203. The pointing device, for example, may be a mouse, a trackball, or a pointing stick for communicating direction information and command selections to the processor 1203 and for controlling cursor movement on the display. In addition, a printer may provide printed listings of data stored and/or generated by the computer system 1201.

The computer system 1201 performs a portion or all of the processing steps of the invention (such as for example those described above in relation to processing the time dependent deviations and deriving the various statistical measures noted above (including the noted probability mass function and probability density function) in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the invention includes software for controlling the computer system 1201, for driving a device or devices (such as sensors and controls) for implementing the invention. Such software may include, but is not limited to, device drivers, operating systems, development tools, and applications software. Such computer readable media further includes the computer program product of the invention for performing all or a portion (if processing is distributed) of the processing performed in implementing the invention.

The computer code devices of the invention may be any interpretable or executable code mechanism, including but not limited to scripts, interpretable programs, dynamic link libraries (DLLs), Java classes, and complete executable programs. These and other programming languages can be used to encode and solve or approximate the above-described model (e.g., the equations enumerated above) used for modelling the vibration amplitudes on the hologram recording and reproducing devices of this invention. Moreover, parts of the processing of the invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

The computer system 1201 can also include a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. In one embodiment, this provides the invention the capability to have multiple of the above described reading and/or recording apparatuses networked together for purposes such as for example factory wide automation or quality control. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213.

Numerous modifications and variations of the present invention are possible in light of the above teachings. It is therefore to be understood that within the scope of the appended claims, the invention may be practiced otherwise than as specifically described herein.

The invention claimed is:

1. An optical information processing apparatus for recording information in a holographic medium, the apparatus comprising:
a laser source which generates a reference beam and a signal beam to record the information in the holographic medium;
a sensor which detects a vibrational amplitude over a time period applied to the optical information processing apparatus for recording said information;
an operational circuit which calculates from the vibrational amplitude at least one statistical measure, which is calculated based on multiple data, of the vibrational amplitude; and
a processor programmed to control a recording mode such that the processor evaluates the calculated statistical measure to stop a recording operation to the holographic medium when the statistical measure exceeds a predefined threshold.

2. The apparatus of claim 1, wherein the statistical measure comprises a probability density function of the vibration amplitude.

3. The apparatus of claim 1, wherein the statistical measure comprises a probability mass function of the vibration amplitude.

4. The apparatus of claim 2, wherein the statistical measure comprises one or more of
a) a standard deviation of at least one of the probability density function and the probability mass function of the vibration amplitude over said time period;
b) a root mean square of at least one of the probability density function and the probability mass function of the vibration amplitude over said time period; or
c) an average of the absolute value of the vibration amplitude over said time period.

5. The apparatus of claim 1, wherein the processer is programmed with a plurality of predefined thresholds.

6. The apparatus of claim 1, wherein said time period is less than an exposure time for said recording said information in the holographic medium.

7. The apparatus of claim 1, wherein said time period is variable.

8. The apparatus of claim 1, wherein
the processor restarts the recording operation when the statistical measure is smaller than the predefined threshold;
the processor determines a judgment as to whether the period from the stopping of the recording operation to the restarting of the recording operation is shorter than a duration of a dark reaction time of the holographic medium; and
the processor controls at least one of a recording position and a recording page of the holographic medium according to the judgment of the processor.

9. The apparatus of claim 1, wherein
the processor is programmed to calculate a residual write exposure time when stopping the recording operation; and
the processor restarts the recording operation with the residual write exposure time when the statistical measure is smaller than the predefined threshold.

10. A method of recording information in a holographic medium, comprising:
detecting a vibration amplitude present on the apparatus of claim 1;
calculating at least one statistical measure of said vibrational amplitude.

11. The method of claim 10, wherein the statistical measure comprises a probability density function of the vibration amplitude.

12. The method of claim 10, wherein the statistical measure comprises a probability mass function vibration amplitude.

13. The method of claim 11, wherein the statistical measure comprises one or more of
   a) a standard deviation of at least one of the probability density function and the probability mass function of the vibration amplitude over said time period;
   b) a root mean square of at least one of the probability density function and the probability mass function of the vibration amplitude over said time period; or
   c) an average of the absolute value of the vibration amplitude over said time period.

14. The apparatus of claim 3, wherein the statistical measure comprises one or more of
   a) a standard deviation of at least one of the probability density function and the probability mass function of the vibration amplitude over said time period;
   b) a root mean square of at least one of the probability density function and the probability mass function of the vibration amplitude over said time period; or
   c) an average of the absolute value of the vibration amplitude over said time period.

15. The method of claim 12, wherein the statistical measure comprises one or more of
   a) a standard deviation of at least one of the probability density function and the probability mass function of the vibration amplitude over said time period;
   b) a root mean square of at least one of the probability density function and the probability mass function of the vibration amplitude over said time period; or
   c) an average of the absolute value of the vibration amplitude over said time period.

16. The apparatus of claim 1 wherein the vibration amplitude that is detected extends in a direction along a degenerate angle of the reference beam.

17. The apparatus of claim 1 wherein the vibration amplitude that is detected extends in a radial direction of the holographic medium.

18. The apparatus of claim 1 wherein the vibration amplitude that is detected extends in a direction along a defocus direction of the reference beam.

19. The apparatus of claim 1 wherein the vibration amplitude that is detected extends in a direction along a Bragg angle of the reference beam.

* * * * *